Patented Sept. 12, 1922.

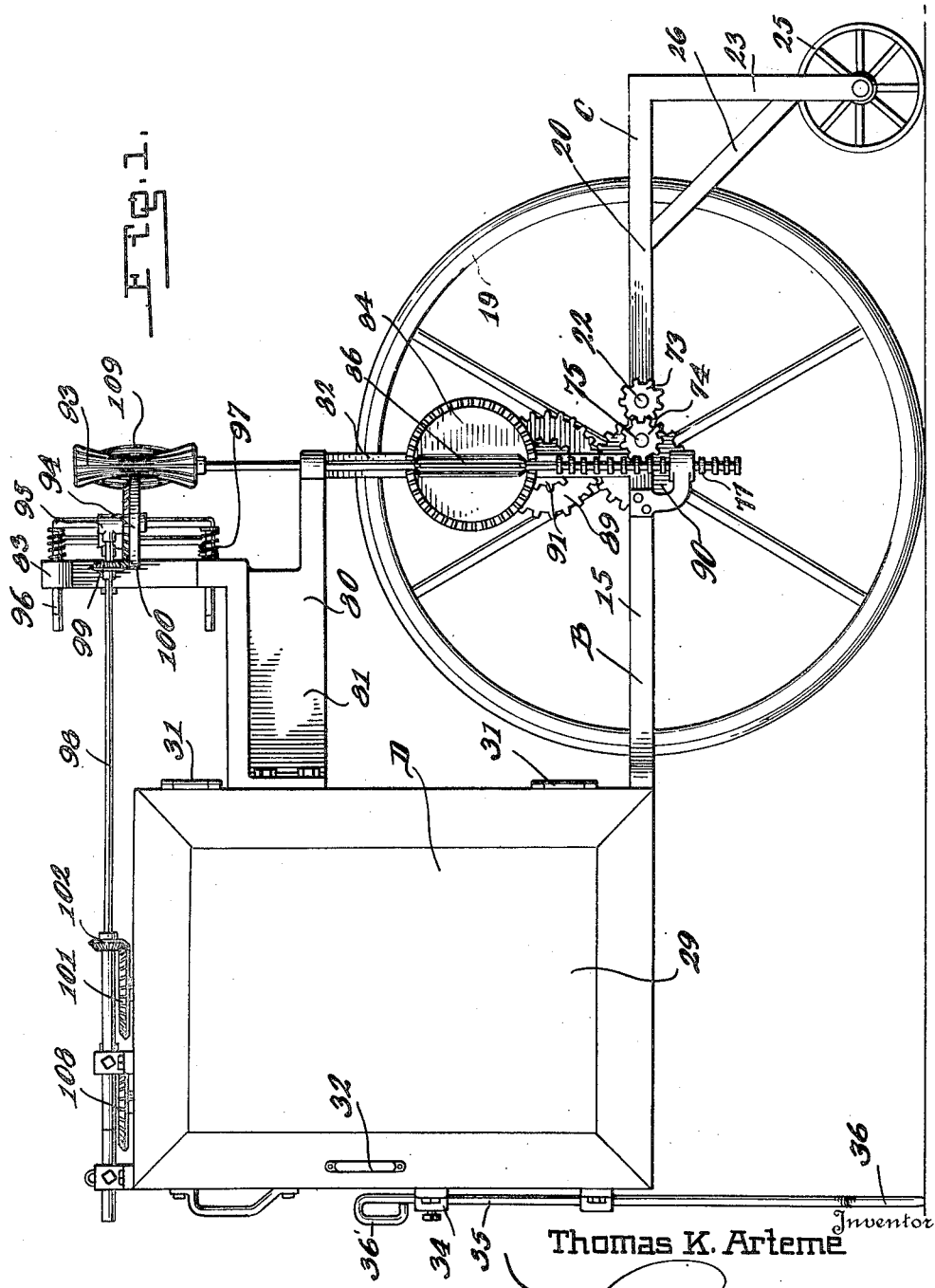

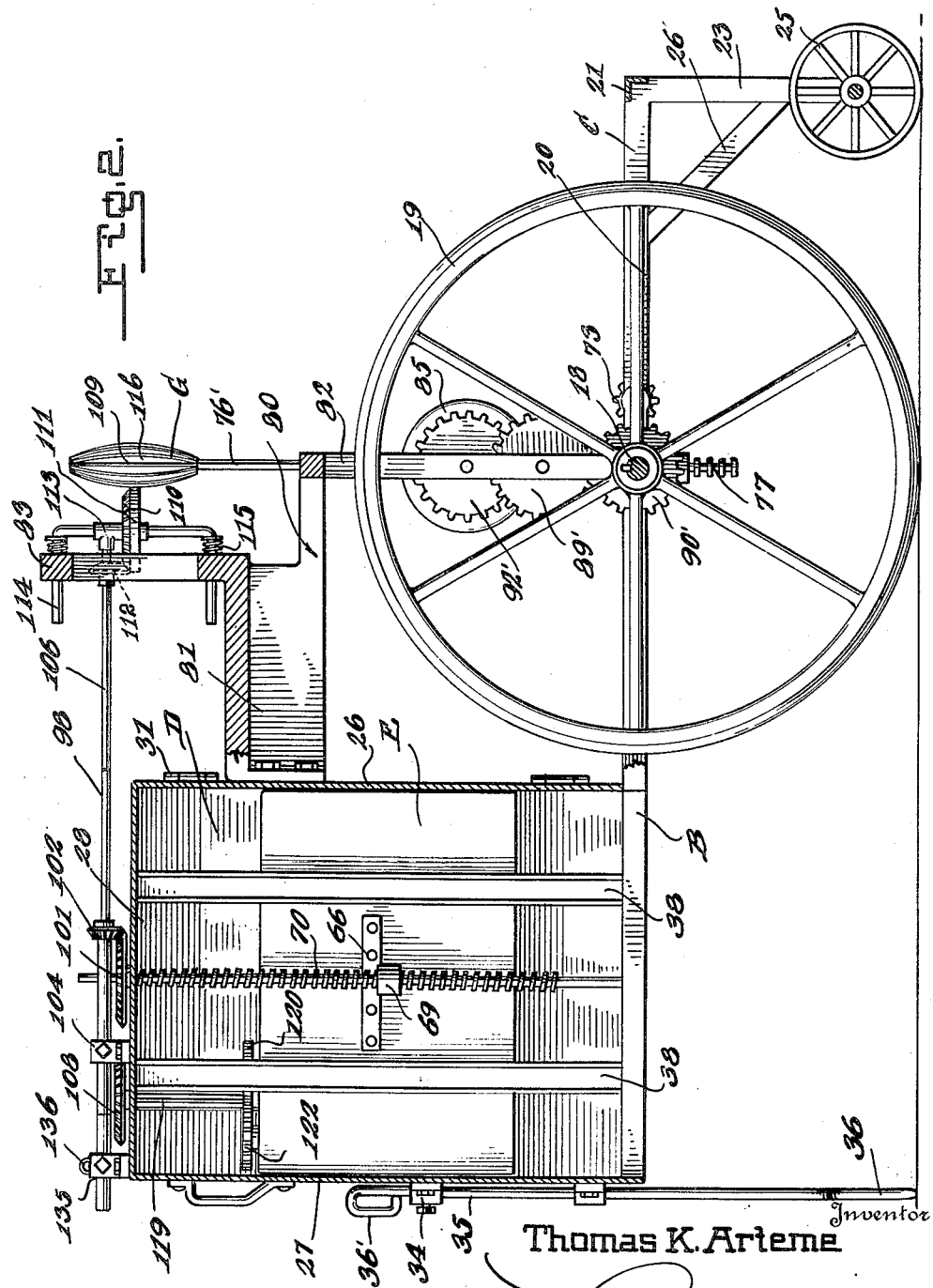

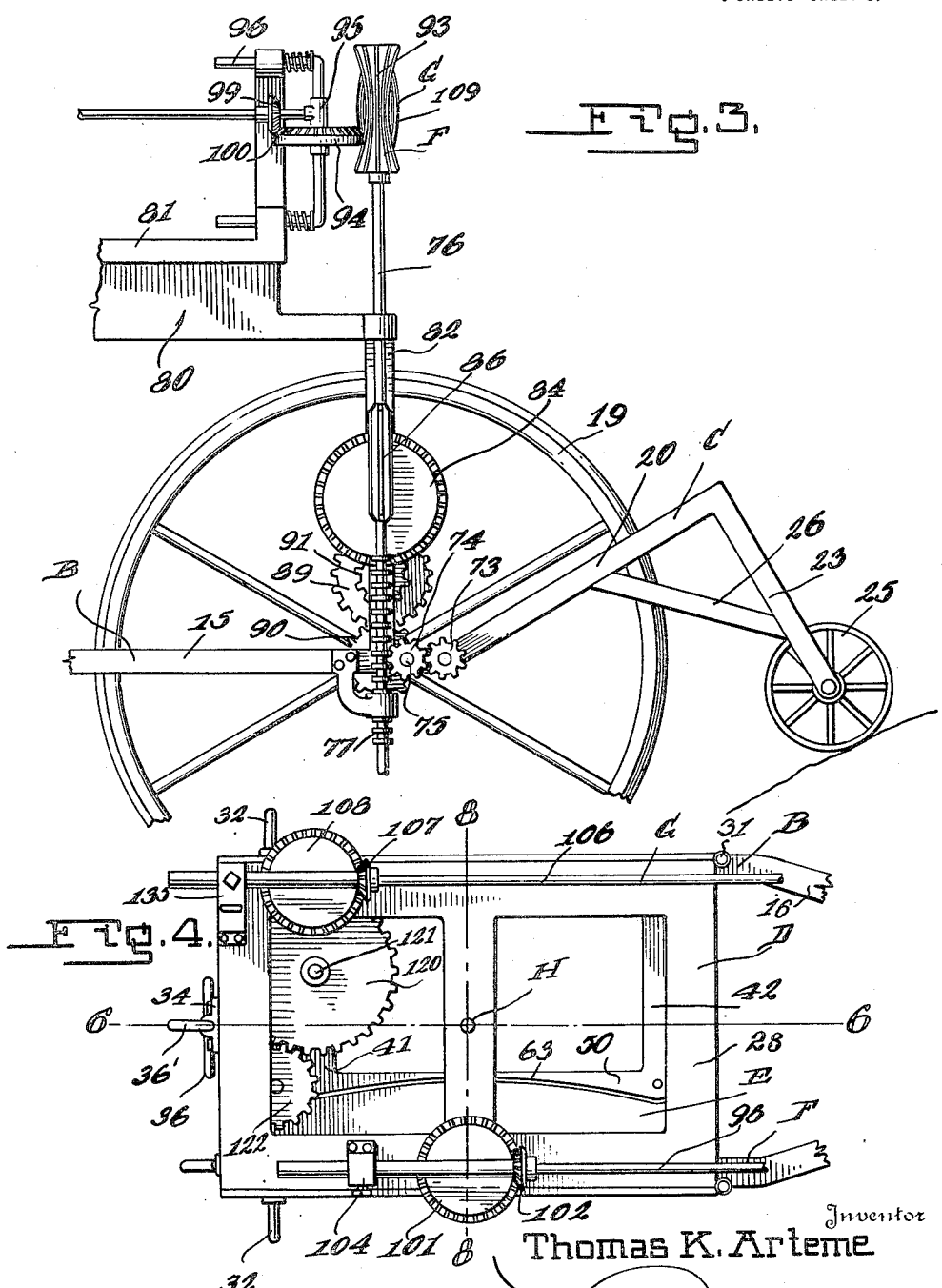

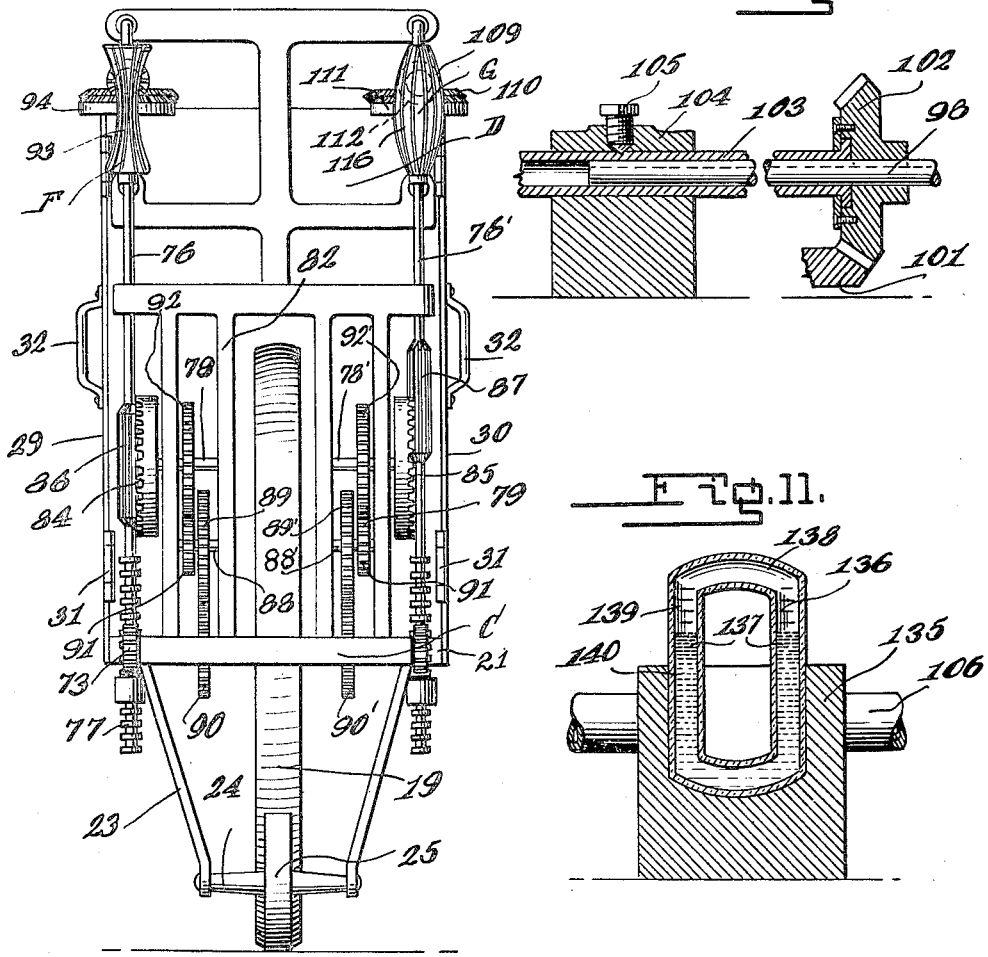

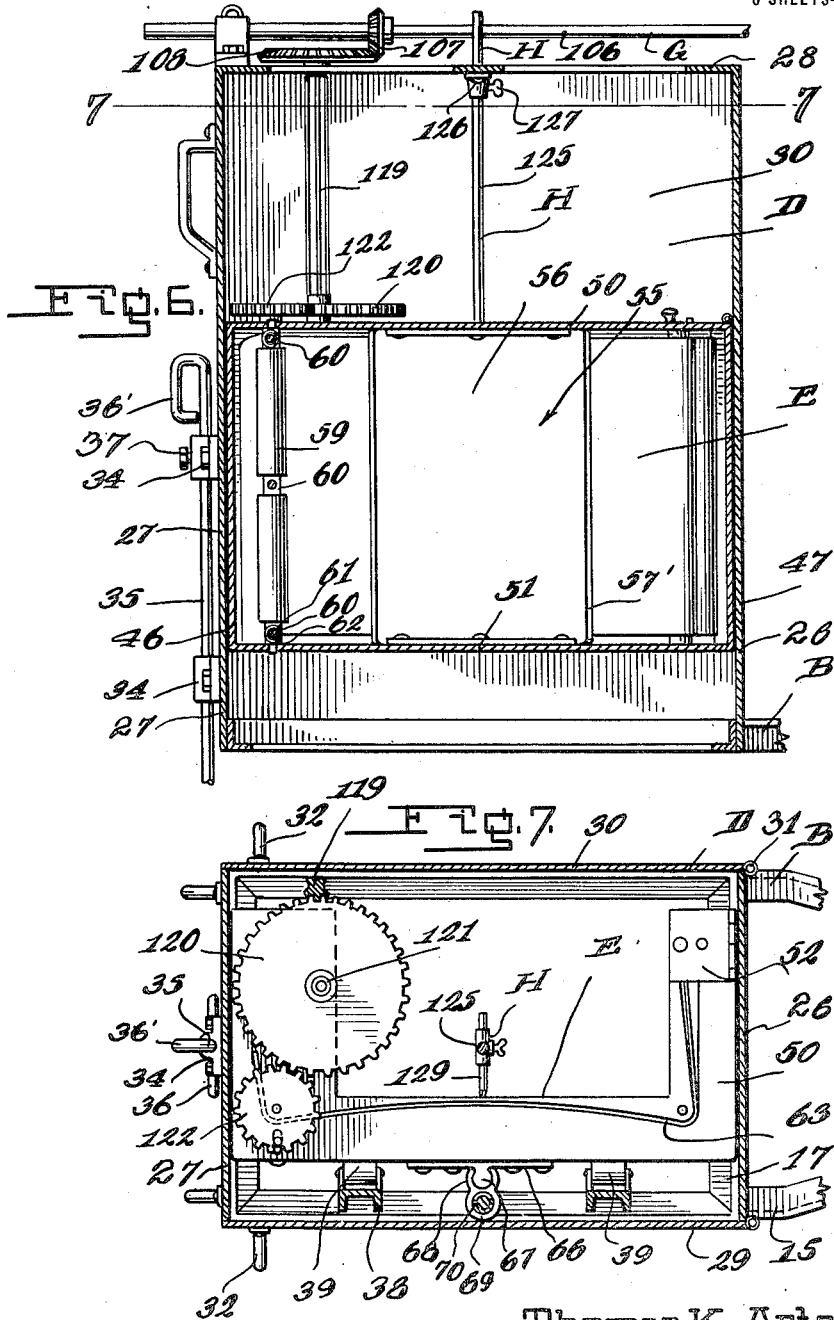

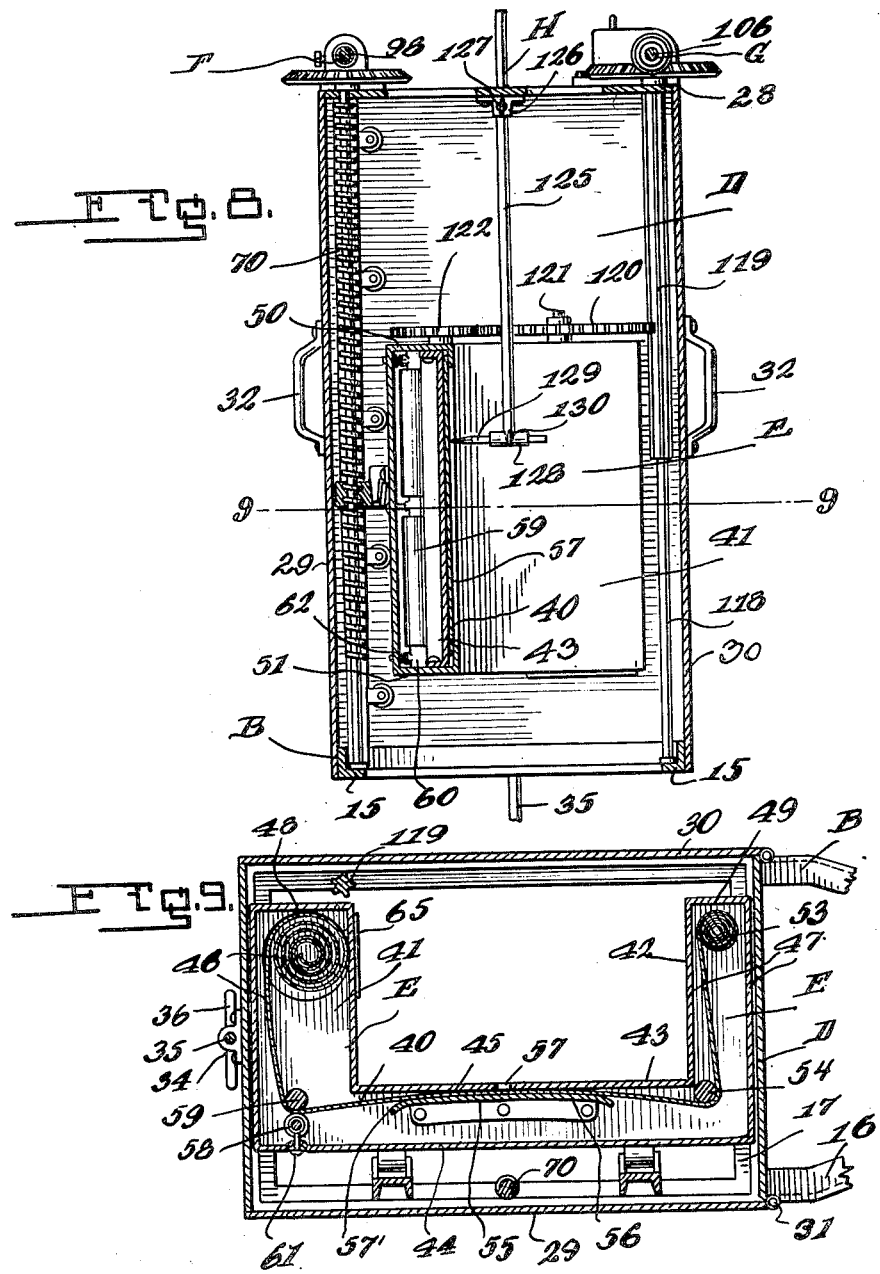

1,428,520

UNITED STATES PATENT OFFICE.

THOMAS K. ARTEME, OF NEW YORK, N. Y., ASSIGNOR OF ONE-HALF TO JOHN P. DRAKAS, OF LOCUST VALLEY, LONG ISLAND, NEW YORK.

PROFILOGRAPH.

Application filed April 8, 1921. Serial No. 459,787.

*To all whom it may concern:*

Be it known that I, THOMAS K. ARTEME, a citizen of the United States, residing at New York, in the county of New York and State of New York, have invented certain new and useful Improvements in Profilographs, of which the following is a specification.

This invention relates to profilographs and has for its primary object to provide a simple and efficient machine for effectively recording the profile or contour of a given portion of the earth's surface with a minimum amount of time and labor.

The method now pursued to obtain a chart or profile of a piece of land by engineers and the like, is to send a surveying gang to the desired location, who in the ordinary manner find the contour or level of the land at certain desired points, and make notes of the level or contour of the land at these points and the distance of the points from each other. These notes taken in the field are then given to a draftsman who then draws the chart or profile of the land. This method requires the services of a number of men, and a considerable amount of time and does not give the contour of the land between the spaced points, and the draftsman consequently fills in between the points on his chart or profile with straight lines or in free hand and thus often the contour of the land will be found different by the engineer in places than the idea he obtains reading the profile.

It is therefore another object of the invention to provide a machine, which is so constructed that it is merely necessary to wheel the same over the desired plot of ground in order to obtain a chart or profile thereof, the machine embodying a novel means for automatically feeding the drawing or chart paper during the moving of the machine over the ground, and a novel means for recording on the paper all the irregularities or contour of the land.

A further object of the invention is to provide an improved profilograph having a novel casing or carrier arranged therein for holding the drawing or chart paper, a novel means for raising and lowering the paper to conform to the contour of the land over which the device is travelling, and a novel means for varying the speed of travel of the drawing or chart paper in the casing acording to the inclination and contour of the land over which the machine is operated.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a side elevation of the improved machine.

Figure 2 is a longitudinal section through the same.

Figure 3 is a fragmentary side elevation of the improved machine showing the contour wheel in a partly raised position.

Figure 4 is a fragmentary plan view of the improved machine.

Figure 5 is a front elevation of the improved machine.

Figure 6 is a fragmentary vertical longitudinal section through the housing portion of the improved machine, taken on the line 6—6 of Figure 4.

Figure 7 is a horizontal longitudinal section through the housing portion of the improved machine, taken on the line 7—7 of Figure 6, showing the drawing or chart paper casing in plan.

Figure 8 is a vertical transverse section through the improved machine taken on the line 8—8 of Figure 4.

Figure 9 is a horizontal longitudinal section taken in the plane below Figure 7 and on the line 9—9 of Figure 8.

Figure 10 is an enlarged fragmentary vertical longitudinal section through a portion of the improved machine, illustrating the means of slidably connecting one of the drive shafts with the housing, and Figure 11 is an enlarged sectional view through a portion of the machine showing the level carried thereby.

Referring to the drawings in detail, wherein similar reference characters designate corresponding parts throughout the several views, the letter A indicates the improved profilograph which includes the main frame B; the contour or supplemental operating frame C; the main housing D; the drawing or chart paper casing E; the operating means F for raising and lowering the paper casing; the operating means G for feeding the paper in said casing; and H the stylus or marking instrument and holder.

The main frame B includes a pair of spaced longitudinally extending side beams 15, which may be either formed of angle or channel iron or solid material. These side beams may be slightly inclined toward their forward ends as at 16, and can be connected at suitably spaced points by transverse strips or beams 17. The side beams 15 adjacent to their forward ends are provided with suitable bearings for rotatably receiving the main drive axle 18 on which is keyed the relatively large ground supporting wheel 19. This wheel 19 may be constructed in any preferred manner and may be provided with solid rim or with a rubber or other cushion tire if so desired.

The forward end of the frame B in advance of the main drive axle 18 has pivotally secured thereto the supplemental or contour operating device C and this frame includes the spaced side beams 20, which are connected, at their forward ends, by means of a transverse beam 21. The inner ends of the side beams 20 have keyed or otherwise rigidly secured thereto, the transversely extending pivot rod 22 and this pivot rod is suitably mounted in bearings carried by the forward ends of the side beams 15 of the main frame B. Thus it can be seen that the supplemental frame C and pivot rod 22 are free to swing in relation to the main frame B. The side beams 20 support at their forward ends the depending inwardly extending arms 23, which support the axle 24 on which is mounted the relatively small supplemental frame raising and lowering wheel 25. If so desired the arms 23 may be suitably braced by means of driving or bracing strips 26'.

The main frame B has arranged thereon in rear of the main ground engaging frame supporting wheel 19, the main housing D, which includes the front and rear walls 26 and 27, the top wall 28 and the side walls 29 and 30. The side walls 29 and 30 are preferably hinged as at 31 to the side edges of the front wall 26 and are provided with suitable handles 32. These handles 32 form means whereby the side walls may be readily thrown open and also can be used as means for pushing the machine over the ground. The side walls 29 and 30 form doors whereby the chart or drawing paper casing E can be readily inserted within the casing, and whereby the operation of the machine can be readily seen. The rear wall 27 has secured thereto a pair of vertically aligned guide brackets 34, in which is slidably mounted the leg 35. The lower end of the leg is forked as at 36 so as to form a relatively broad bearing surface for engagement with the ground. The upper end of the leg is provided with a handle 36'. The leg 35 can be held in any preferred adjusted position in the bearing 34 by means of an adjustable set screw 37. It can be seen that the leg 35 holds the rear end of the frame B and the housing D in a raised position, when the machine is in a position of rest. The housing D also has mounted therein adjacent to and in parallel relation with the side wall 29 a pair of vertically disposed channel beams 38. These channel beams 38 may have their lower terminals secured to one of the side channel or angle beams 15, and their upper ends to the upper wall of the housing D. These channel beams 38 support at predetermined points antifriction rollers 39 which are adapted to engage the chart or drawing paper casing E during the sliding movement thereof, as will be hereinafter more specifically described. The chart or drawing paper casing E is freely removable from the housing D and forms the means for receiving the drawing or chart paper designated by the numeral 40. This housing D is substantially U-shaped in plan and includes the two parallel portions 41 and 42 and the connecting longitudinally extending portion 43. The length of the casing E is substantially equal to the length of the housing D, so as to prevent slipping of the casing E within the housing D, thus insuring the correct position of the casing E within the housing D at all times. The antifriction rollers 39 carried by the guide channel beams 38 are adapted to engage the inner wall of the casing E and also forms means for guiding the casing during the raising and lowering movement thereof as will be hereinafter more specifically described.

The casing E includes the outer longitudinally extending side wall 44, the inner longitudinally extending side wall 45, a pair of spaced end walls 46 forming one of the parallel portions of the casing, and the pair of spaced end walls 47 forming the other parallel portion of the casing. These end walls 46 and 47 respectively are connected by relatively narrow end walls 48 and 49 respectively. Substantially U-shaped upper and lower walls 50 and 51 are provided for the casing and these walls engage respectively the upper and lower edges of the side walls 44 and 45, the pairs of end walls 46 and 47 and the connecting end walls 48 and 49. The end of the parallel portion 42 is provided with a hinged cover 52 through which the paper roller 53 is adapted to be inserted. This paper roller 53 has wound thereon the supply of chart or drawing paper 40 and suitable bearings may be provided for the roller 53 at the upper and lower ends thereof. The drawing, chart or profile paper 40 is fed from off of the roller 53 through the longitudinal portion 43 of the casing and then into the other parallel portion 41 of the casing where the same is permitted to rewind through the inherent properties thereof, and in order to insure the correct passage of the paper through the casing, a guide roller 54 is provided for the paper at the meeting terminal of the parallel portion 42 and the longitudinally extending portion 43. The paper is then fed past a longitudinally extending guide 55 which constitutes a plate 56, the terminals of which are slightly flared as at 57'. This plate 56 forms a rest for the paper during the marking thereon by the writing instrument H and the inner longitudinal wall 45 is provided with a vertically disposed slot 57 through which the writing instrument is adapted to protrude for engaging the paper. The paper 40 is then fed between a spring pressed guide roller 58 and a drive roller 59 which is driven by the means G which will be hereinafter more fully described. The guide roller 58 is preferably spring pressed, so that the paper 40 will be tightly pressed, at all times, against the drive roller 59 thereby insuring of the correct feeding of the paper. As shown the drive roller is mounted upon suitable spindles which have their terminals mounted in suitable slide blocks 60 and these slide blocks 60 are provided with guide pins 61 which slidably extend through one wall 44 of the casing E. These pins 61 have coiled around the same suitable expansion coil springs 63. If so desired the upper wall 50 may be provided with a slide slot 63 for facilitating the initial feeding of the paper 40 between the rollers 54, 58 and 59. When all of the paper 40 has been fed off of the roller 53, the paper may be removed from the casing by means of a slide door 65, which is carried by the end of the parallel portion 41 of the casing.

The outer surface of the wall 44 at the vertical center thereof has secured thereto a bracket 66 which is provided with an outwardly extending attaching lug 67 which is gradually tapered toward its lower end. This attaching lug 67 is adapted to be detachably received in a tapered socket 68 which is formed on the feed nut 69. This feed nut 69 is threaded on the vertically disposed feed screw 70 which is arranged within the housing D. The terminals of the feed screw 70 are suitably rotatably mounted in the upper and lower ends of the casing and this feed screw is driven by the means F which will be now described. It can be seen, however, that when the feed screw is rotated, the paper casing will be raised or lowered according to the direction of rotation of the screw.

The writing instrument H is held stationary during the raising and lowering of the paper casing E and during the feeding of the paper within the casing. Thus it can be seen that as the casing is raised and lowered and as the paper is fed within the casing, that a line will be made on the drawing or chart paper which will conform to the profile or contour of the land over which the machine is driven. As heretofore stated, the raising and lowering of the casing is controlled by the operating means F actuated by the supplemental frame C and the feeding of the paper is controlled by the operating means G also actuated by the supplemental frame C.

The terminals of the pivot rod 22 carried by the supplemental frame C has rigidly secured thereto in any preferred manner the gear wheels 73 which mesh with a pair of gear wheels 74, which are keyed or otherwise secured to the transversely extending counter shafts 75. These counter-shafts are rotatably carried by the forward end of the frame C adjacent to the pivot rod 22. One of the gear wheels 73 and one of the gear wheels 74 constitutes a portion of the operating means F while the other gear wheel 73 and the other gear wheel 74 constitute a part of the operating means G and the gear wheels 74 engage a sliding vertical shaft 76, and a shaft 76' respectively. These shafts 76 and 76' are provided with annular teeth 77 and these teeth are arranged in spaced relation and are adapted to be engaged by the teeth of the gear wheels 74. Thus it can be seen that when the gear wheels 74 are rotated, the shafts 76 and 76' will be raised or lowered thereby. It is to be also understood that the shafts 76 constitute a portion of the operating means F while the other shaft 76' constitutes a portion of the operating means G. Drive shafts 78 and 78' are provided for operating the vertically disposed shafts 76 and 76' of the operating means F and G and these shafts 78 and 78' are arranged transversely across the frame B and are operatively connected to the axle 18 of the relatively large ground wheel 19 by means of speed reducing mechanism 79.

In order to form a suitable support for the speed reducing mechanism 79 and the vertically disposed shafts 76 and 76' a forwardly extending frame 80 is carried by the main frame B and the housing D. This frame 80 includes a forwardly extending bracket 81 which is bolted or otherwise secured to the forward wall 26 of the housing D and a plurality of depending spaced arms or bars 82. These depending spaced bars or arms 82 are secured to the forward end of the bracket 81 and have their lower ends secured to the forward end of the main frame B and may be provided with suitable bearings for the drive axle 18. The forwardly extending bracket 81 also supports an upwardly extending bracket 83, the purpose of which will also be hereinafter more fully described. The drive shafts 78 and 78' have keyed to the terminals thereof the crown gear wheels 84 and 85, which are adapted to mesh respectively with the elongated spur gear wheels 86 and 87 which are keyed or otherwise secured to the vertical shafts 76 and 76'. The elongated gear 86 is so arranged on the shaft 76 that the same will normally lie between the teeth formed on the periphery of the crown gear 84 and thus when the machine is being pushed over a plane surface, the shaft 76 will not be rotated by the gear 84, but as soon as the supplemental frame C is raised or lowered by raised portions of the ground or depressed portions of the ground, the gear 86 will be raised or lowered by the shaft 76 and thus moved into engagement with the upper or lower edge of the gear 84. The elongated gear 87 is so positioned on the shaft 76' that the central portion thereof is only engaged by the upper end of the crown gear 85 and thus the shaft is normally driven in one direction during the forward movement of the machine and during the raising and lowering of the shaft 76' the elongated gear 87 will constantly remain in mesh with the upper end of the gear 85. The drive shafts 78 and 78' are driven by the speed reducing mechanism 79 and this mechanism 79 includes the counter shafts 88 and 88' that are suitably journalled in the depending arms 82. These counter shafts 88 and 88' have mounted respectively thereon gear wheels 89 and 89', that mesh respectively with gear wheels 90 and 90' which are keyed or otherwise secured to the terminals of the drive axle 18. The shafts 88 and 88' also have keyed or otherwise secured thereto the relatively small spur gear wheels 91 and 91' and these gear wheels 91 and 91' mesh respectively with relatively large gear wheels 92 and 92', which are carried by the drive shafts 78 and 78'.

It can be seen from the foregoing that the drive mechanism 76 is arranged on one side of the wheel 19 while the drive mechanism for the shaft 76' is arranged on the opposite side of the wheel 19.

The operating means F also includes the variable friction drive gear 93. The outer surface of this friction drive gear 93 is concaved, so that the central portion thereof will gradually decrease in diameter toward the transverse center thereof and this gear is of elongated form so as to permit the constant meshing thereof with the friction wheel 94 during the raising and lowering of the shaft 76. It can be seen that when the friction gear 93 is raised or lowered the friction wheel 94 will be driven at a relatively high rate of speed owing to the tapered shape of the gear 93. This is for a purpose which will be hereinafter more fully described. The friction wheel 94 is rotatably carried by a sleeve 95 which is carried by the U-shaped bracket 96 the legs of which are slidably mounted in one end of the upstanding frame 83. Expansion springs 97 are coiled around the legs of the bracket 96 and normally tend to urge the friction wheel 94 into engagement with the friction gear 93. The sleeve 95 also forms the bearing for the longitudinally extending drive shaft 98 which has keyed or otherwise secured thereon a relatively small bevelled gear 99 which meshes with a bevelled gear 100 formed on the friction drive wheel 94. The shaft 98 forms the means for driving the feed screw 70 and the feed screw has keyed to its upper end a relatively large gear wheel 101 which can be readily removed when so desired, for a purpose which will hereinafter more fully appear. This bevelled gear wheel 101 has constantly meshing therewith a relatively small bevelled gear wheel 102 which is feathered on the shaft 98. In order to hold the relatively small gear wheel 102 against sliding movement during the sliding of the shaft 98 under the influence of the coil springs 97, the gear wheel 102 is rotatably carried by a stationary bearing sleeve 103 which is slidably carried by suitable bearing members 104 mounted in the upper wall of the casing B. The bearing sleeve 103 is held against accidental sliding and rotary movement in the bearing brackets 104 by means of set screws or the like 105. The bearing sleeve 103 slidably and rotatably supports the shaft 98. Thus it can be seen that during the sliding movement of the shaft 98 relatively small bevelled gear wheel 102 will be in constant mesh with the gear wheel 101.

The operating means G for feeding the chart, profile or drawing paper 40 also includes a longitudinally extending shaft 106 which is arranged in spaced parallel relation to the shaft 98, and this shaft also has slidably mounted thereon the relatively small bevelled pinion 107, which is constantly in mesh with the relatively large bevelled gear wheel 108. The shaft 106 is formed exactly like the shaft 98 and the bevelled gear wheel 107 is mounted thereon in the same manner as the bevelled gear wheel 102 on the shaft 98. This permits the free sliding movement of the shaft 106 in relation to the gear 107. The forward end of the shaft 106 has keyed or otherwise secured thereto the relatively small bevelled pinion 112 which meshes with the relatively large bevelled pinion 110 which is formed on the friction wheel 111 which is adapted to engage the friction gear wheel 109. The friction gear wheel 109 is keyed or otherwise secured to the vertical shaft 76'. The bevelled pinion 110 and the friction wheel 111 are rotatably carried by a sleeve 113 which in turn is carried by a U-shaped bracket 114, the legs of which are slidably carried by the end of the frame 83 opposite to the end of the frame which carries the U-shaped bracket 96. The frame 114 also has coiled around the legs thereof expansion springs 115. The provision of the coil springs 115 on the sliding bracket 114 insures the engaging of the friction wheel 111 with the friction gear wheel 109 at all times. The friction gear wheel 109 is of elongated cylindrical shape and has the outer surface thereof convex so that the diameter of the gear will be gradually increased from its ends toward its transverse center as clearly shown in the drawings. The friction drive gear wheels 93 and 109 may be provided with longitudinal grooves 116 so as to form irregular surfaces of the gears and thus insuring a driving connection between the same and the friction wheels 94 and 111. It can be seen that as the shaft 76' is raised or lowered, the speed of the friction wheel 111 will be gradually decreased, for a purpose which will hereinafter more fully appear. The relatively large gear wheel 108 is carried by a vertically disposed operating shaft 118 which is removably carried by the casing G and this shaft has keyed or otherwise secured thereto an elongated spur gear wheel 119 which is adapted to mesh with a relatively large spur gear wheel 120 which is rotatably mounted upon a stub shaft 121 carried by the top wall 50 of the casing E. This relatively large gear wheel 120 meshes with a relatively small gear wheel 122 which is keyed or otherwise secured to the upper terminal of the drive roller 59, which engages the profile, chart or drawing paper 40. Thus it can be seen that during the movement of the machine over the ground, the drawing, profile or chart paper will be moved progressively through the casing E.

The marking device H includes a vertically disposed rod 125, which is slidably mounted in a bearing bracket 126 carried by the upper wall of the housing D and this rod 125 is held in any preferred adjusted position by means of a set screw 127. The lower end of the rod 125 terminates in a sleeve 128 which slidably supports the stylus, pencil or other marking instrument 129. The pencil, stylus or other marking instrument 129 is held in any preferred adjusted position in the sleeve by a set screw 130. As heretofore stated the pencil or other marking instrument is adapted to be so adjusted that the marking point thereof will be extended within the slot 57 formed in the side wall 45 of the casing E. Thus during the feeding of the paper through the casing E and the raising and lowering movement of the casing E, a line will be drawn on the paper.

The rear end of the housing D carries a block 135 on the upper surface thereof and this block, if so desired, may be formed integral with the bearing bracket for the bearing sleeve for the shaft 106. This block has suitably embedded therein the level tube 136 which constitutes a pair of vertically disposed arms 137, which are connected by upper and lower arms 138. The vertical arms 137 are provided with suitable indicating marks 139 which may be numbered if so desired. The level tube 136 is partly filled with level seeking fluid 140 and when the fluid in both of the legs are at the same indicating mark on the legs, it can be seen that the frame B and the housing D are on the level and in a horizontal plane.

In operation of the improved machine, the same is carried to the plot of ground, the exact contour or profile of which is desired to be made, and the drawing, profile or chart paper is threaded to the casing E as heretofore described and the pencil or other marking instrument 129 is adjusted into engagement therewith. The machine is then ready for use and is wheeled over the ground. The frame B and the housing D is normally held in a horizontal or level position which can be readily determined by the operator by means of the level tube 136 and it can be seen that when irregularity in the surface of the ground is encountered that the frame C will be either raised or lowered, which will either raise or lower the shafts 76 and 76'. It can be seen that when the shafts 76 and 76' are lowered, the elongated gear 86 will move into engagement with the lower edge of the crown gear 84 and will be driven in an opposite direction from the shaft 76'. The speed of rotation of the shafts 98 and 106 will be determined by the distance the shafts 76 and 76' have been raised or lowered, but it can be seen that owing to the shape of the friction gears 93 and 109, when the shaft 76 is lowered, the shaft 98 will be driven at an increased speed, while when the shaft 76' is raised or lowered, the shaft 106 will be driven at a decreased speed. The lowering movement of the shaft 76 will start the operation of the shaft 98, which in turn will rotate the feed screw 70 and feed the nut 69 down thereon, which will lower the casing E, thus making a mark thereon. At the same time that the casing is being lowered, the paper is being fed through the same by means of the roller 59 which has been driven by means of the shaft 106. When a sharp grade is encountered the frame C of course will be abruptly raised which will lower or raise the shafts 76 and 76' rather quickly and it is therefore desired to raise or lower the casing E rather quickly so as to conform to the sharp inclination of the ground, and this is accomplished by means of the tapered shape of the friction gear wheel 93. When the frame C is being raised and lowered, it is not desirable to feed the paper 40 as fast as when the machine is being wheeled over level ground so that the profile be drawn according to scale and this is accomplished by the peculiar shape of the gear wheel 109, which when raised or lowered drives the shaft 106 at a decreased speed. It also can be seen that when the frame C is raised the elongated gear will engage the upper edge of the crown gear 84 and thus rotate the shaft 98 in a direction opposite to the direction in which it is rotated when the frame C is lowered, which serves to raise the paper casing E in the housing D. When the machine is being moved along the level ground the elongated gear wheel 86 is in a neutral position between the upper and lower edges of the gear 84 and thus the casing is held at an intermediate point against raising and lowering movement. The profile or contour of the land may be drawn to any desired scale and when it is desired to change the scale of the profile it is merely necessary to remove the gear wheels 101 and 108 and substitute larger or smaller gear wheels therefor according to whether the scale is to be enlarged or made smaller. When larger or smaller gear wheels 101 and 108 are substituted, the relatively small gear wheels 102 and 107 are adjusted into meshing engagement therewith by adjusting the bearing sleeves 103 in the bearing blocks 104.

The casing E is freely removable from the housing D so that the strip of paper 40 may be readily placed within the casing or removed therefrom. When it is desired to remove the casing E from the housing D it is merely necessary to remove the shaft 118 from its bearings in said casing and loosen the set screw 127 and push up on the rod 125 of the marking mechanism H. The door or side wall 30 is then swung on its hinges and the casing E is lifted up so as to remove the lug 67 from the socket 68. The casing E can then be readily removed from the housing through the opening left by the door 30.

From the foregoing description, it can be seen that an exceptionally simple and durable device has been provided for effectively recording the exact contour or profile of the surface of the ground in an expeditious and convenient manner without the employment of surveyors, draftsmen and the like.

Changes in details may be made without departing from the spirit or scope of this invention; but,

I claim:

1. A profilograph comprising a main frame, profile paper carried by the main frame, a stationary marking instrument carried by the main frame, a supplemental frame hingedly carried by the main frame, a ground engaging wheel carried by the supplemental frame, and means operatively connected to the swinging supplemental frame for feeding the paper past the marking instrument and for raising and lowering the paper in relation to the marking instrument.

2. A profilograph comprising a main frame, drawing paper mounted on said frame, a stationary marking instrument for engaging said paper, a supplemental frame hingedly carried by the main frame, means for raising and lowering said paper by said second frame in proportion to the swinging of said frame by the irregularities in the surface of the land over which the machine is travelling, and means operated by said supplemental frame for moving the paper past the marking instrument in proportion to the distance travelled by said main frame over the surface of the ground.

3. A machine for recording the profile of a surface comprising a main frame, a wheel for supporting the frame, a supplemental frame carried by the main frame, a ground engaging wheel carried by the supplemental frame, a profile paper casing slidably mounted on the frame, a strip of paper in said casing, a marking instrument arranged to engage the strip of paper, means actuated by said swinging supplemental frame for raising and lowering the casing on the main frame in relation to the marking instrument, and means operated by said supplemental frame for moving the strip of paper in said casing past said marking instrument.

4. A machine for recording the profile of a surface including a wheeled main frame, a supplemental frame hingedly carried by the main frame and arranged to move according to the irregularities in said surface, a strip of profile paper carried by said frame, a drive shaft carried by the main frame operatively connected to the strip for raising and lowering the same in relation to the frame, a second operating shaft, means operatively connecting the second operating shaft with the paper strip for moving the strip longitudinally of the frame, a stationary marking instrument arranged to engage the strip, means operated by said swinging frame for rotating the first mentioned drive shaft at variable speeds according to the inclination of the supplemental frame, and means operated by the supplemental frame for rotating the second mentioned drive shaft for varying the speed of said drive shaft according to the inclination of said supplemental frame.

5. A machine for recording the profile of a surface including a wheeled frame, a recording strip carried by the frame arranged for movement longitudinally of the frame and vertically in relation to the frame, a shaft for moving the paper vertically in relation to the frame, an operating shaft for moving the paper longitudinally of the frame, a swinging supplemental frame carried by the main frame, arranged to move according to the irregularities of the surface over which the machine is moved, means operated by the supplemental frame for increasing the speed of rotation of the first mentioned operating shaft according to the angle of the supplemental frame in relation to the main frame, and means operated by the supplemental frame for increasing the speed of rotation of the second mentioned shaft according to the angle of the supplemental frame in relation to the main frame.

6. A machine for recording the profile of a surface comprising a wheeled frame, a housing carried by the wheeled frame, a casing for the recording strip detachably carried by the housing and arranged for movement vertically within the housing, a strip of paper arranged in said strip adapted for movement longitudinally of the casing, a feed nut, a screw carried by the housing receiving said nut, an operating shaft, means operatively connecting the feed screw with said shaft, means operated by the supplemental frame for controlling the rotation of said shaft and means for rotating said shaft by the travel of said wheeled frame over the surface.

7. A machine for recording the profile of a surface including a frame, a ground wheel for supporting the frame, a removable casing carried by the frame and arranged for sliding movement vertically of the frame, a recording strip arranged in said frame, means for feeding the strip inwardly in said casing operated by said ground wheel, means operated by said ground wheel for raising and lowering the casing vertically of the frame, and a swinging supplemental frame arranged to move according to the variations in the surface, and means operated by said supplemental frame for controlling the speed of rotation of the operating mechanism for the casing and for said recording strip.

8. A machine for recording the profile of a surface comprising a main frame, a ground wheel for supporting the main frame, a supplemental frame hingedly carried by the main frame and arranged for movement according to the variations in the surface over which the machine is moved, a casing slidably carried by the main frame arranged for movement in a vertical plane, a recording strip in said casing arranged for movement longitudinally of the casing, a stationary marking instrument carried by the frame and arranged to engage the record strip, a pair of operating shafts, means operatively connecting one of the operating shafts with said casing for raising and lowering the casing, means operatively connecting the other shaft with the record strip for moving the same longitudinally in the casing, and means for controlling the speed and direction of rotation of said shafts according to the inclination of said supplemental frame in relation to the main frame.

9. A machine for recording the profile of a surface comprising a frame, a housing carried by the frame, a casing arranged within the housing for sliding movement in a vertical plane, a level tube carried by the housing, a ground wheel carried by the main frame, a supplemental frame hingedly carried by the main frame and arranged for movement in accordance with the variation in the surface over which the machine is moved, a wheel carried by said supplemental frame for engaging the ground, a recording strip arranged for movement in said casing, the casing having a marking slot therein, a marking instrument arranged to engage said paper through said slot, means for feeding the paper in said casing past said slot, a vertically disposed feed screw, a nut threaded on said feed screw, means detachably fitting said casing on said nut, a longitudinally extending shaft, removable gears for connecting the longitudinally extending shaft with said feed screw, a friction wheel, means operatively connecting the friction wheel with said longitudinal shaft, a vertically disposed shaft, a variable friction gear carried by said shaft, means normally holding the friction wheel into engagement with the friction gear, means for driving the vertically disposed shaft from said ground wheel, and means for raising and lowering the vertical shaft to move the variable speed gear in relation to the friction wheel controlled by said swinging supplemental frame.

10. In a machine for recording the profile of a surface, a main supporting frame, a ground wheel for the frame, a swinging supplemental frame carried by the main frame arranged to move according to the variations in said surface, a vertical slidable casing carried by said main frame having a slot therein, a record strip arranged in said casing, a feed roller in said casing arranged to engage the paper for feeding the same past said slot, a stationary marking instrument carried by the frame and arranged to engage said paper through said slot, a level tube mounted on said frame, a longitudinally extending operating shaft, removable gears for connecting said operating shaft with said drive roller, a vertically disposed shaft, means for operating said vertically disposed shaft from said ground wheel, means for raising and lowering said shaft by said swinging supplemental frame, a variable friction gear wheel carried by said vertical shaft and having its outer surface gradually convexed from the outer end toward its transverse center, a friction wheel, means normally urging the friction wheel into engagement with the variable speed friction gear, and means operatively connecting the friction wheel with said longitudinally extending shaft.

11. In a machine for recording the profile of a surface, a main frame, a housing carried by the main frame, a ground wheel for supporting the main frame, a supplemental frame hingedly carried by the main frame and arranged to move on the main frame according to the variations in said surface, a pair of parallel vertically disposed shafts slidably carried by said main frame, speed reducing gears for rotating said shafts from said ground wheel, a pair of longitudinally extending shafts carried by the frame, a casing slidably mounted on the frame for movement in a vertical plane, a paper strip arranged in said casing, the casing having a slot therein, a marking instrument arranged to engage the paper through said slot, means operated by one of said shafts for feeding the paper in said casing past said slot, means operated by other of said shafts for raising and lowering the casing, a convex variable friction speed gear carried by one of the vertically disposed sliding shafts, a concave variable friction speed gear carried by the other vertically disposed sliding shaft, friction wheels for engaging said variable speed gear, and means operatively connecting one of said friction wheels with one of said longitudinally extending shafts, and means operatively connecting the other friction wheel with the other longitudinally extending shaft.

12. In a machine for recording the profile of a surface, a main frame, a ground wheel for supporting the main frame, a level tube carried by the frame, a pair of vertically disposed parallel shafts arranged on the frame, a pair of drive shafts arranged on the main frame, speed reducing mechanism operatively connecting the drive shafts with the ground wheel, crown gear wheels carried by the outer ends of said drive shafts, an elongated spur gear carried by one of the vertically disposed shafts arranged to normally lie between the upper and lower edges of one of said crown gears, an elongated spur gear wheel carried by the other vertically disposed shaft arranged to engage the upper edge of the other crown gear at all times, means operated by said supplemental frame for raising and lowering the vertically disposed shafts, a convex elongated variable speed friction gear carried by one of the vertically disposed shafts, a concaved elongated variable speed friction gear carried by the other vertically disposed shaft, a pair of friction wheels arranged to engage said variable friction speed gear, spring means for normally holding the wheels in engagement with said gears, a pair of longitudinally extending shafts operatively connected to said wheels, and means operated by said shafts for raising and lowering the casing in relation to said main frame, and for feeding the paper past said slot in said casing.

THOMAS K. ARTEME.